(12) United States Patent
Simms (10) Patent No.: US 10,351,243 B2
(45) Date of Patent: Jul. 16, 2019

(54) AIRCRAFT OVERHEAD STOWAGE BINS

(71) Applicant: The Boeing Company, Chicago, IL (US)

(72) Inventor: Richard K. Simms, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 15/178,920

(22) Filed: Jun. 10, 2016

(65) Prior Publication Data
US 2017/0355463 A1    Dec. 14, 2017

(51) Int. Cl.
*B64D 11/00* (2006.01)
*B61D 37/00* (2006.01)

(52) U.S. Cl.
CPC .......... *B64D 11/003* (2013.01); *B61D 37/003* (2013.01)

(58) Field of Classification Search
CPC .......... B64D 11/003; B64D 2011/0046; B61D 37/003; B61D 45/00; B61D 47/00
See application file for complete search history.

(56) References Cited

U.S. PATENT DOCUMENTS

| | | | |
|---|---|---|---|
| 3,473,674 A * | 10/1969 | Fau | A47B 55/02 211/151 |
| 5,988,565 A | 11/1999 | Thomas et al. | |
| 6,354,424 B1 * | 3/2002 | Rowles | B60P 1/52 193/35 A |
| 6,886,781 B2 | 5/2005 | Lau et al. | |
| 8,657,231 B2 * | 2/2014 | Burrows | B64D 11/003 244/118.1 |
| 8,727,278 B2 * | 5/2014 | Moritz | F16F 1/18 244/118.5 |
| 2014/0197721 A1 * | 7/2014 | Savian | B64D 11/0015 312/248 |

FOREIGN PATENT DOCUMENTS

| | | |
|---|---|---|
| DE | 10 2004 044 216 | 3/2006 |
| EP | 2 865 597 A2 | 4/2015 |

(Continued)

OTHER PUBLICATIONS

FR2908383Translation.*

(Continued)

*Primary Examiner* — Assres H Woldemaryam
(74) *Attorney, Agent, or Firm* — DASCENZO Intellectual Property Law, P.C.

(57) ABSTRACT

Overhead stowage bins for aircraft comprise a lower panel and one or more rollers. The lower panel is configured to support luggage and has a forward lip region. The one or more rollers are operatively coupled to the lower panel within the forward lip region and are positioned to facilitate insertion of luggage into the overhead stowage bin. Aircraft include a fuselage and a plurality of overhead stowage bins installed within the passenger compartment of the fuselage. Methods of stowing luggage in an overhead stowage bin comprise lifting a carry-on luggage unit, engaging the carry-on luggage unit with one or more rollers positioned at a forward lip region of the overhead stowage bin, and pushing the carry-on luggage unit into an internal volume of the overhead stowage bin.

22 Claims, 3 Drawing Sheets

(56) References Cited

FOREIGN PATENT DOCUMENTS

| FR | 2908383 | * 11/2006 | ............. B64D 11/00 |
| FR | 2 908 383 | 5/2008 | |

OTHER PUBLICATIONS

Machine generated English translation of abstract for FR 2 908 338, downloaded from Espacenet.com on Aug. 10, 2017.
Machine generated English translation of abstract for DE 10 2004 044 216, downloaded from Espacenet.com on Aug. 10, 2017.
European Patent Office, Extended European Search Report for related European patent application EP 17169515, dated Jun. 29, 2017.

* cited by examiner

Fig. 7

```
         ,-100
   ,-102
  ┌─────────┐
  │ LIFTING │
  └────┬────┘
       │ ,-104
  ┌────▼─────┐
  │ ENGAGING │
  └────┬─────┘
       │ ,-106
  ┌────▼────┐
  │ PUSHING │
  └────┬────┘
       ┊ ,-108
  ┌────▼────┐
  │ PULLING │
  └─────────┘
```

AIRCRAFT OVERHEAD STOWAGE BINS

FIELD

The present disclosure relates to overhead stowage bins in aircraft.

BACKGROUND

Air travel may present difficulties for passengers and crew of a small stature, of an elder age, and/or with physical challenges. For example, insertion and/or removal of luggage from overhead stowage bins may be difficult for such passengers and crew.

SUMMARY

Overhead stowage bins comprise a lower panel and one or more rollers. The lower panel is configured to support one or more luggage units positioned within the overhead stowage bin, and the lower panel has a forward lip region that partially defines an entrance to the overhead stowage bin. The one or more rollers are operatively coupled to the lower panel within the forward lip region, and the one or more rollers are positioned to facilitate insertion of the one or more luggage units into the overhead stowage bin. The overhead stowage bin defines an internal volume for receiving the one or more luggage units atop the lower panel. The overhead stowage bin has a closed configuration, in which access to the internal volume is restricted, and an open configuration, in which access to the internal volume is permitted via the entrance for insertion and removal of the one or more luggage units into and from the internal volume. Aircraft comprise a fuselage including a passenger compartment, and a plurality of the overhead stowage bins installed within the passenger compartment.

Methods of stowing luggage in an overhead stowage bin comprises lifting a carry-on luggage unit, engaging the carry-on luggage unit with one or more rollers positioned at a forward lip region of the overhead stowage bin, and pushing the carry-on luggage unit into an internal volume of the overhead stowage bin, with the pushing resulting in the one or more rollers rotating.

DESCRIPTION

Figures 1, 7:
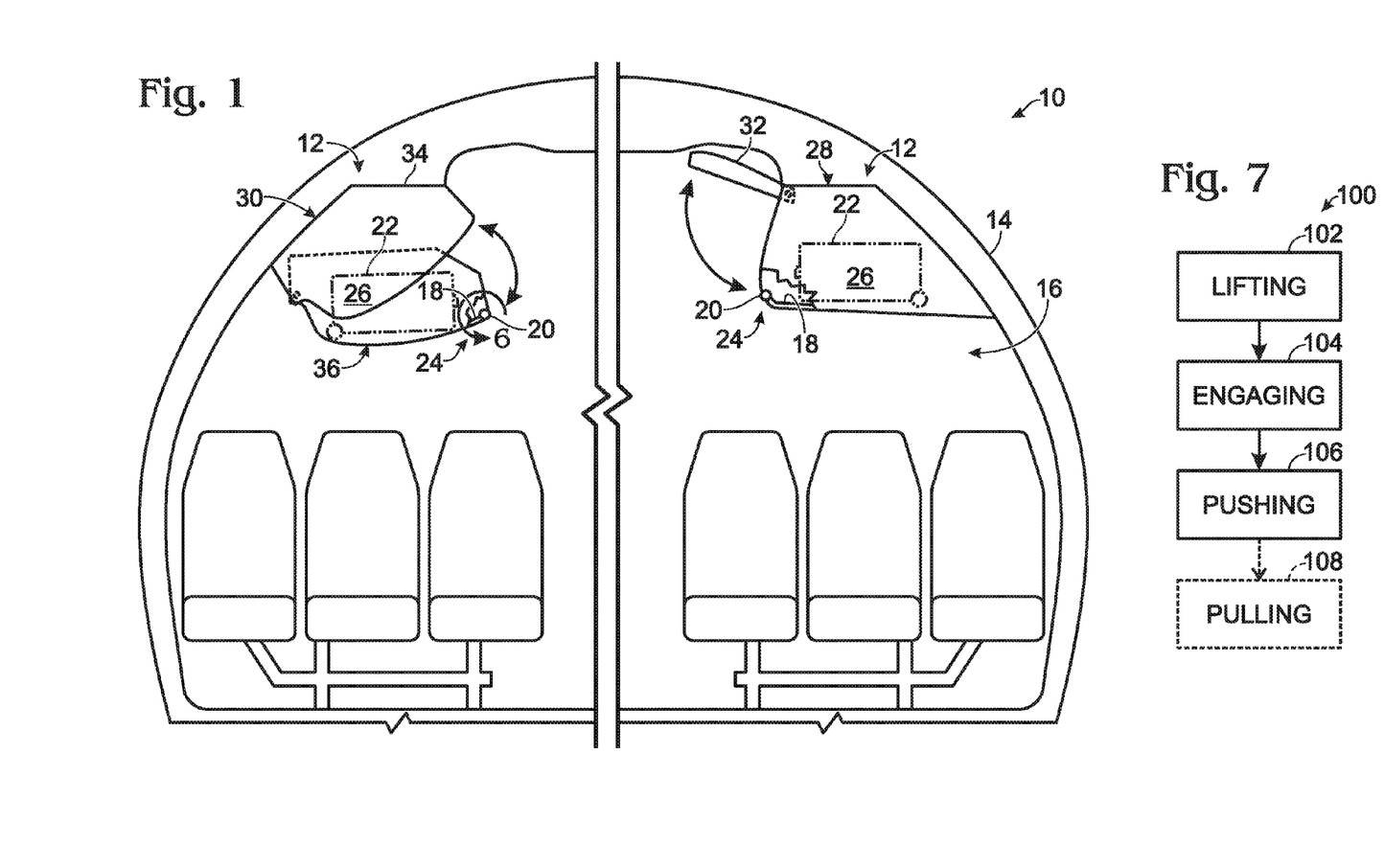
FIG. 1 is a schematic illustration representing aircraft interiors including overhead stowage bins according to the present disclosure.
FIG. 7 is a flowchart schematically representing methods of stowing luggage in an overhead stowage bin.

Overhead stowage bins for aircraft, as well as aircraft with overhead stowage bins and related methods, are disclosed herein. In FIG. 1, example aircraft 10 that may include overhead stowage bins 12 according to the present disclosure are schematically represented. An aircraft 10 includes a fuselage 14 that includes a passenger compartment 16 for carrying passengers and crew. An aircraft 10 may take any suitable form, including a commercial aircraft, a military aircraft, a private aircraft, or any other suitable aircraft, including both fixed wing aircraft and rotorcraft. FIG. 1 schematically illustrates a single aisle, six-seat row passenger aircraft for illustrative purposes only, and aircraft 10 are not so limited.

An overhead stowage bin 12 comprises at least a lower panel 18 and one or more rollers 20. The lower panel 18 is configured to support one or more luggage units 22 positioned within the overhead stowage bin 12. Luggage units 22 additionally or alternatively may be referred to as carry-on luggage units 22 and/or simply as luggage 22. The lower panel 18 has a forward lip region 24 that partially defines an entrance to the overhead stowage bin 12. The one or more rollers 20 are operatively coupled to the lower panel 18 within the forward lip region 24, and the one or more rollers 20 are positioned to facilitate insertion of luggage 22 into the overhead stowage bin 12. The overhead stowage bin 12 defines an internal volume 26 for receiving luggage 22 atop the lower panel 18. Moreover, the overhead stowage bin 12 has a closed configuration, in which access to the internal volume 26 is restricted, and an open configuration, in which access to the internal volume 26 is permitted via the entrance for insertion and removal of luggage 22 into and from the internal volume 26.

Overhead stowage bins 12 may be configured as shelf bins 28, schematically represented on the right side of FIG. 1, or as pivot bins 30, schematically represented on the left side of FIG. 1, similar to typical overhead stowage bins of aircraft. However, aircraft 10 may include only a single style of overhead stowage bin 12, and FIG. 1 should not be interpreted to require aircraft 10 to have two types, or styles, or overhead stowage bins 12, let alone to having only shelf bins 28 and/or only pivot bins 30. That is, overhead stowage bins 12 may be configured, or have a style, other than as shelf bins 28 or pivot bins 30.

When in the form of a shelf bin 28, an overhead stowage bin 12 further comprises an access door 32 that is pivotally coupled relative to the lower panel 18. The access door 32 and the lower panel 18 at least partially define the internal volume 26 of the shelf bin 28. The access door 32 is configured to be selectively pivoted between a closed position in the closed configuration of the shelf bin 28 and an open position in the open configuration of the shelf bin 28.

When in the form of a pivot bin 30, an overhead stowage bin 12 comprises a frame 34 that, when operatively installed, is fixed within the passenger compartment 16, and a bucket 36 that is pivotally coupled to the frame 34. The bucket 36 at least partially defines, and in some embodiments collectively with the frame 34 defines, the internal volume 26 of the pivot bin 30. The bucket 36 is configured to be selectively pivoted between a closed position in the closed configuration of the pivot bin 30 and an open position in the open configuration of the pivot bin 30. The bucket 36 comprises at least the lower panel 18 and the one or more rollers 20, and also may include side panels, or walls, and/or a rear panel, or wall, that are fixed to the lower panel 18. Additionally or alternatively, two or more of the lower panel, a side wall, and a rear wall may be constructed as a unitary panel.

Turning now to FIGS. 2-5, various examples of overhead stowage bins 12 are schematically represented. In FIGS. 2-5, the overhead stowage bins 12 are schematically represented as being sized to hold four units of luggage 22; however, overhead stowage bins 12 may have any suitable size, including being sized to hold one, two, three, four, five, six, or more than six units of luggage. Moreover, overhead stowage bins 12 may be sized and described in association with typical carry-on luggage units, such as that major airlines approve as carry-on luggage for passengers. For example, typical carry-on luggage units may have widths in the range of 10-20 inches, 10-18 inches, 10-16 inches, 10-14 inches, 14-20 inches, 14-18 inches, or 14-16 inches.

Figure 2:
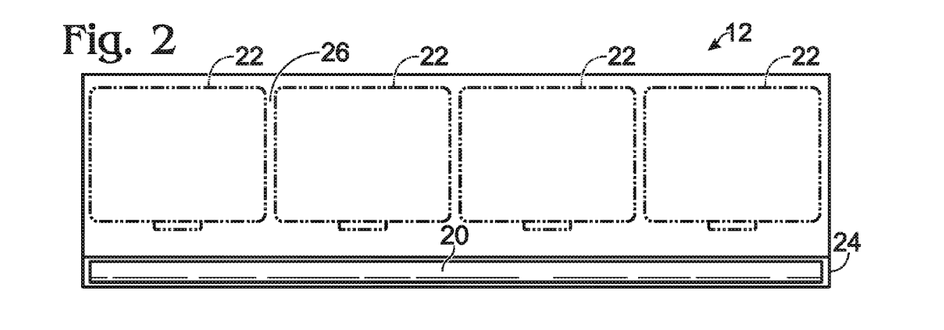
FIG. 2 is a schematic illustration representing example overhead stowage bins according to the present disclosure.

With reference to FIG. 2, some overhead stowage bins 12 include only a single roller that substantially spans an entirety of (i.e., the width of) the forward lip region 24. Additionally or alternatively, some overhead stowage bins 12 include only a single roller that spans 75-100% of an entirety of the forward lip region 24. In such examples, when a luggage unit 22 is being inserted into or removed from the overhead stowage bin 12, the luggage unit 22 may engage the roller 20 regardless of where along a width of the overhead stowage bin 12 the luggage unit 22 is being inserted or removed.

Figure 3:
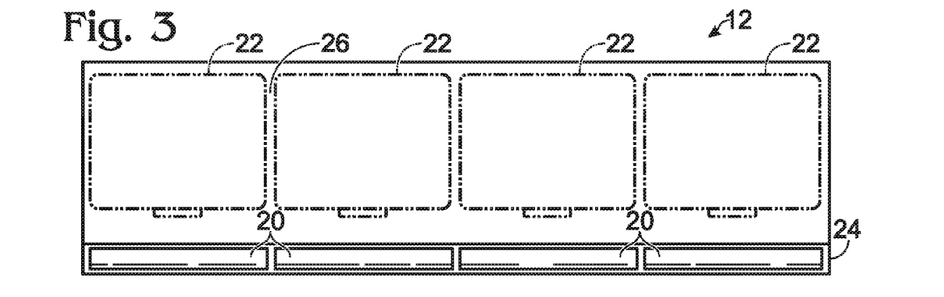
FIG. 3 is a schematic illustration representing example overhead stowage bins according to the present disclosure.
Figure 4:
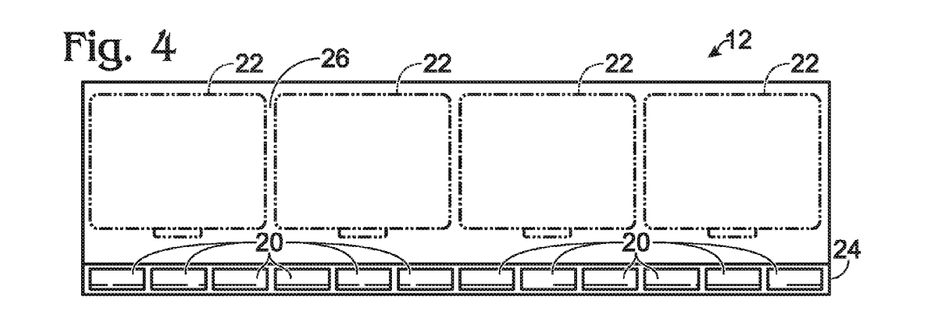
FIG. 4 is a schematic illustration representing example overhead stowage bins according to the present disclosure.
Figure 5:
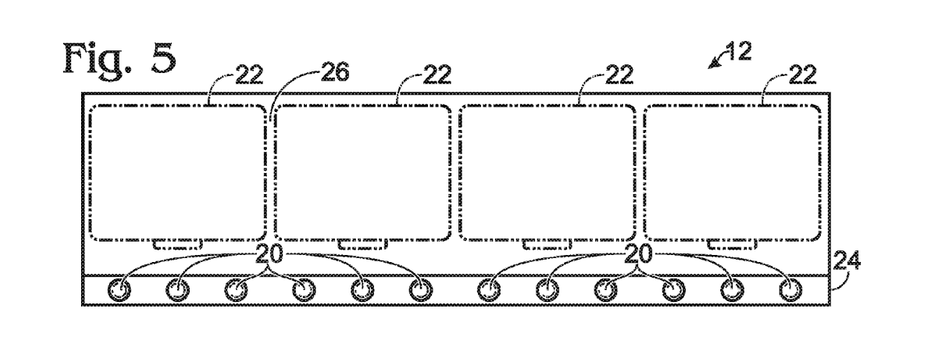
FIG. 5 is a schematic illustration representing example overhead stowage bins according to the present disclosure.

With reference to FIGS. 3-5, some overhead stowage bins 12 include a plurality of rollers 20 that are spaced-apart within the forward lip region 24. Such a configuration may be desirable, particularly in connection with overhead stowage bins 12 that are sized to hold more than one unit of luggage 22. For example, it is often the case that more than one passenger is inserting and/or removing respective luggage 22 at the same time, and by having a plurality of rollers 20, one passenger's actions may not affect another passenger's actions.

For example, with reference to FIG. 3, in some such examples, the overhead stowage bin 12 has a number of rollers 20 equal to a quantity of typical carry-on luggage units 22 to be positioned within the overhead stowage bin 12. Again, FIG. 3 schematically illustrates four luggage units 22, and thus four rollers 20, but less than or more than four rollers 20 corresponding to a quantity of typical carry-on luggage units 22 to be positioned within an overhead stowage bin 12 may be included in an overhead stowage bin 12. In some such examples, the rollers 20 each have a width that is in the range of 50-100% of a width of typical carry-on luggage units 22. Additionally or alternatively, in such examples, the rollers 20 each may have a width in the range of 10-16 inches. Such configurations of overhead stowage bins 12 may assist passengers in aligning luggage units 22 within the overhead stowage bin 12, such as to facilitate subsequent insertion of additional luggage units 22 by other passengers.

With reference to FIG. 4, in some examples, the overhead stowage bin 12 has a number of rollers equal to two, three, four, or more than four times a predetermined quantity of typical carry-on luggage units 22 to be positioned within the overhead stowage bin 12. FIG. 4 schematically illustrates three rollers per luggage unit 22 for illustrative purposes only. In some such examples, the rollers 20 each have a width in the range of 2-6 inches. Such configurations of overhead stowage bins 12 may be well suited for receiving luggage units 22 of various widths.

In some examples of overhead stowage bins 12, such as schematically represented in FIGS. 2-4, the one or more rollers 20 may each be a cylindrical roller. When in the form of a cylindrical roller, a roller 20 may be operatively installed within the forward lip region 24 using any suitable mechanism. For example, the cylindrical rollers may be generally hollow, and the forward lip region 24 may include one or more pairs of opposing posts that extend into the hollow interior of respective cylindrical rollers. Additionally or alternatively, the forward lip region 24 may include one or more pairs of opposing pockets, and ends, or posts extending from the ends, of respective cylindrical rollers may extend into the pockets. Other configurations of cylindrical rollers and forward lip regions 24 also may be utilized, including configurations that incorporate roller bearing assemblies. Cylindrical rollers may have diameters in the range of 0.5-2 inches, although diameters outside of this range also may be used. In other examples of overhead stowage bins 12, such as schematically represented in FIG. 5, a plurality of rollers 20 may each be a spherical, or ball, roller. When in the form of a spherical roller, a roller 20 may be operatively installed within the forward lip region 24 using any suitable mechanism. Suitable spherical rollers may be those generally described as ball transfers, and may include balls having diameters in the range of 0.25-1 inch, although diameters outside of this range also may be used. Such configurations of overhead stowage bins 12 may facilitate not only linear insertion and removal of luggage 22 into and from overhead stowage bins 12, but also may facilitate lateral movement of luggage 22 during the process of insertion and/or removal of luggage 22, due to the spherical rollers being permitted to roll in any direction in some examples of overhead stowage bins 12.

Rollers 20 may be constructed of any suitable material, including (but not limited to) light-weight hard plastics. Additionally or alternatively, rollers 20 and/or the forward lip region 24 may be constructed of, or have a coating of, a low-friction material, such as (but not limited to) a polyimide (e.g., DELRIN™ and KAPTON™ brands) or a fluoropolymer (e.g., TEFLON™ brand).

In some examples of overhead stowage bins 12, the rollers 20 are configured to rotate only in a single rotational direction. In some such examples, the single rotational direction corresponds to an exposed portion of a roller 20 traveling toward the internal volume 26 of the overhead stowage bin 12. For example, with reference to FIG. 6, in such examples, the roller 20 would be configured only to rotate counter-clockwise. In such examples, the one or more rollers 20 therefore may assist in insertion of luggage 22 into the overhead stowage bin, but not assist in removal of luggage 22 from the overhead stowage bin. However, overhead stowage bins 12 also may include rollers 20 that are configured to rotate in both directions, and thus assist both in insertion and removal of luggage into and from an overhead stowage bin 12.

Figure 6:
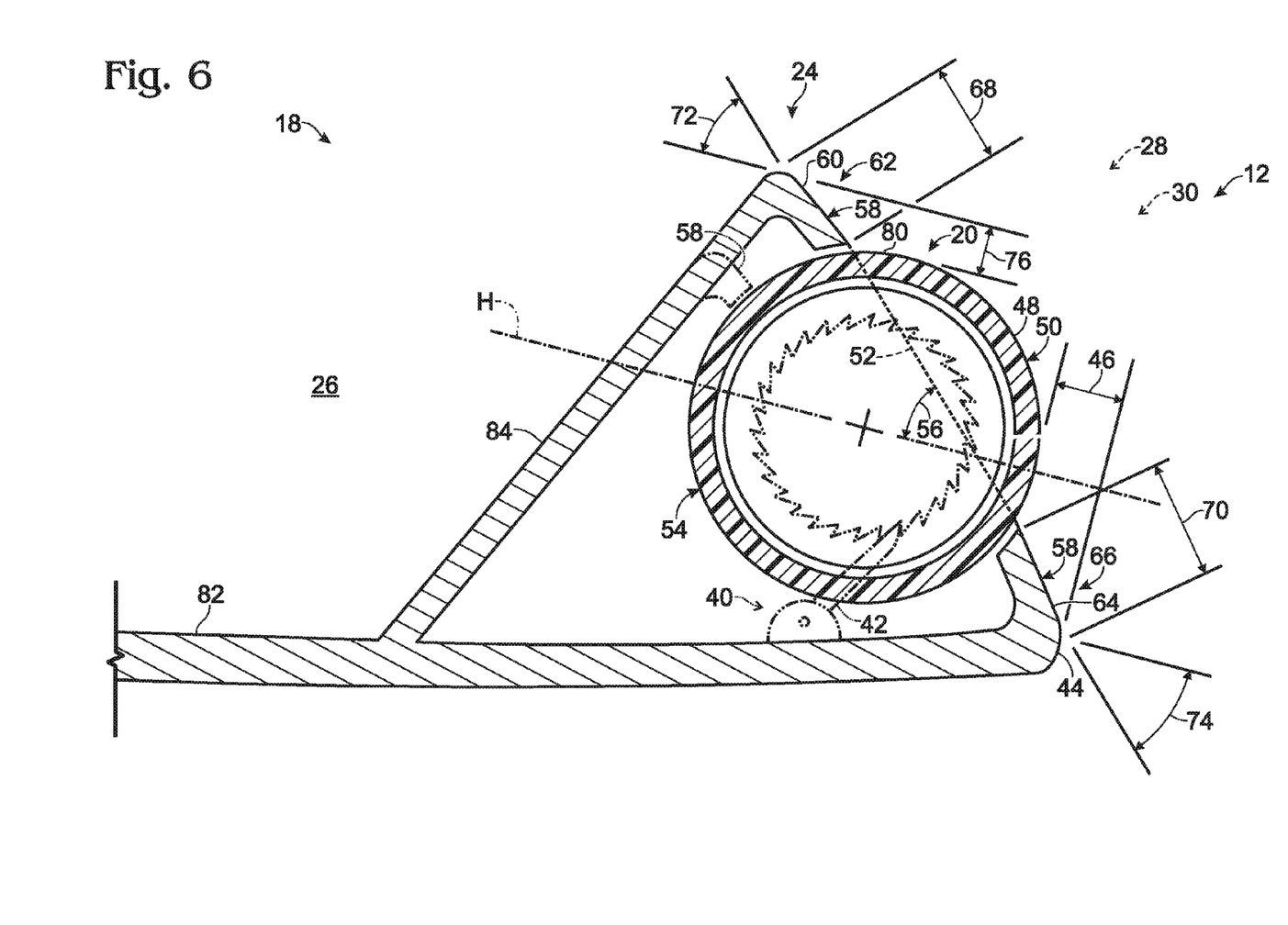
FIG. 6 is a schematic fragmentary, cross-sectional view representing example overhead stowage bins according to the present disclosure.

With continued reference to FIG. 6, some examples of overhead stowage bins 12 further comprise a rotational limiting mechanism 40 that is operatively coupled to the one or more rollers 20. In such examples, the rotational limiting mechanism 40 is configured to permit rotation of the one or more rollers 20 in a first rotational direction and restrict rotation of the one or more rollers 20 in a second rotational direction opposite the first rotational direction. In some such examples, and as optionally discussed, the first rotational direction corresponds to an exposed portion of a roller traveling toward the internal volume 26 of the overhead stowage bin 12. As used herein, "restrict" does not necessarily mean prevent, and in some such examples, the rotational limiting mechanism 40 is further configured to permit rotation of the one or more rollers 20 in the second rotational direction. For example, in some such examples, the rotational limiting mechanism 40 is further configured to impart a rotational friction to the one or more rollers 20 that is greater in the second rotation direction than in the first rotational direction. In other words, the one or more rollers may more freely rotate in the first direction and in the second direction. As a result, both insertion and removal of luggage into and from the overhead stowage bin 12 may be facilitated, with the one or more rollers 20 restricting luggage 22 from rolling out of the overhead stowage bin 12 more quickly than desired by a person pulling the luggage 22 out of the internal volume 26 of the overhead stowage bin 12.

In other examples, the rotational limiting mechanism 40 is configured to prevent rotation of the one or more rollers 20 in the second rotational direction.

When present, the rotational limiting mechanism 40 may take any suitable configuration to perform the corresponding function of the rotational limiting mechanism 40. As an illustrative, non-exclusive example, FIG. 6 schematically presents a rotational limiting mechanism 40 comprising a ratcheting mechanism 42; however, other configurations also may be incorporated into overhead stowage bins 12, and rotational limiting mechanisms 40 may include one or more of clutch structures or assemblies, detent structures, dampeners, springs, stops, pegs, etc.

With continued reference to the schematic representation of overhead stowage bins 12 in FIG. 6, in some examples, the forward lip region 24 has a distal most edge 44 that extends beyond the one or more rollers 20 relative to the internal volume 26 of the overhead stowage bin 12, at least when the overhead stowage bin 12 is in the open configuration. For example, when the overhead stowage bin 12 is a shelf bin 28, the distal most edge 44 is fixed; however, when the overhead stowage bin 12 is a pivot bin 30, the distal most edge 44 pivots between the bucket's open and closed positions. In some such examples, when the overhead stowage bin 12 is in the open configuration, the distal most edge 44 extends beyond the one or more rollers 20 relative to the internal volume 26 by a distance 46 in the range of 10-100% of a diameter of the one or more rollers 20. Such configurations of overhead stowage bins 12 may facilitate a person initially resting a luggage unit 22 against the distal most edge 44 when first lifting and beginning to insert the luggage unit 22 into the overhead stowage bin 12, such as to enable the person to control when the luggage unit 22 first engages the one or more rollers 20. Additionally or alternatively, such configurations of overhead stowage bins 12 may facilitate a person resting a luggage unit 22 against the distal most edge 44 when removing the luggage unit 22 from the overhead stowage bin 12, such as to enable the person to pause and control the rate of removal of the luggage unit 22 from the overhead stowage bin 12.

In some examples of overhead stowage bins 12, less than 50%, less than 40%, or less than 30% of an external surface 48 of the one or more rollers 20 is exposed for engagement by luggage 22 being inserted into or removed from the internal volume 26 of the overhead stowage bin 12. Such configurations of overhead stowage bins 12 may facilitate a person's controlled insertion and removal of a luggage unit 22 into and from an overhead stowage bin 12, such as by permitting the person to tilt the luggage unit relative to the one or more rollers 20 so that the luggage unit frictionally engages an adjacent portion of the forward lip region 24 of the overhead stowage bin 12.

In some examples of overhead stowage bins 12, an exposed portion 50 of each of the one or more rollers 20 is exposed for engagement by luggage 22 being inserted into or removed from the internal volume 26 of the overhead stowage bin 12, and a plane 52 intersecting the one or more rollers 20 and dividing the exposed portion 50 and a hidden portion 54 is at an angle 56 in the range of 15-50 degrees relative to horizontal (H) when the overhead stowage bin 12 is in the open configuration. Such configurations of overhead stowage bins 12 may facilitate an optimum angle of placement of luggage 22 being inserted into or removed from an overhead stowage bin 12.

In some examples of overhead stowage bins 12, the forward lip region 24 comprises a lip surface 58 that extends directly adjacent to the one or more rollers 20. In some such examples, the lip surface 58 may have a proximal portion 60 that extends on a first side 62 of the one or more rollers 20 proximate the internal volume 26 of the overhead stowage bin 12. In some such examples, the proximal portion 60 has a depth 68 that is 10-50% of a diameter of the one or more rollers 20. In some examples, the proximal portion 60 is generally planar and extends at an angle 72 in the range of 15-50 degrees relative to horizontal (H) when the overhead stowage bin 12 is in the open configuration. In some examples, the proximal portion 60 extends above the one or more rollers 20 by a distance 76 in the range of 10-100% of a diameter of the one or more rollers 20 when the overhead stowage bin 12 is in the open configuration. Such configurations of overhead stowage bins 12 may facilitate a person controlling the insertion and removal of a luggage unit 22 into and from an overhead stowage bin 12, such as by providing a surface for frictional engagement with the luggage unit 22 and/or to serve as a fulcrum for pivoting the luggage unit into and out of the internal volume 26 of the overhead stowage bin 12.

Also in some such examples, the lip surface 58 may have a distal portion 64 that extends on a second side 66 of the one or more rollers 20 distal the internal volume 26 of the overhead stowage bin 12. In some such examples, the distal portion 64 has a depth 70 that is 10-50% of a diameter of the one or more rollers 20. In some examples, the distal portion 64 is generally planar and extends at an angle 74 in the range of 15-50 degrees relative to horizontal (H) when the overhead stowage bin 12 is in the open configuration. Such configurations of overhead stowage bins 12 may facilitate a person controlling the insertion and removal of a luggage unit 22 into and from an overhead stowage bin 12, such as by providing a surface for frictional engagement with the luggage unit 22.

In some examples of overhead stowage bins 12, a top surface 80 of the one or more rollers 20 extends vertically above an entirety of the lip surface 58 when the overhead stowage bin 12 is in the open configuration, as schematically indicated with a dashed line in FIG. 6 with forward lip region 24 terminating below the top surface 80 of the one or more rollers 20. Stated differently, in some examples of overhead stowage bins 12, a top surface 80 of the one or more rollers 20 extends vertically above an entirety of the forward lip region 24 when the overhead stowage bin 12 is in the open configuration. Such configurations of overhead stowage bins 12 may facilitate insertion of luggage 22 into an overhead stowage bin 12, such as by enabling contact between the luggage 22 with the one or more rollers 20 during a substantial portion of the movement of the luggage 22 into the overhead stowage bin 12 without a surface or structure presenting sliding frictional engagement between the forward lip region 24 and the luggage 22. Additionally or alternatively, such configurations of overhead stowage bins 12 may facilitate removal of luggage 22 from an overhead stowage bin 12, such as by enabling contact between the luggage 22 and the one or more rollers 20 without a person first having to lift, or substantially lift, a forward region of the luggage 22.

With continued reference to FIG. 6, in some examples of overhead stowage bins 12, the lower panel 18 comprises a support surface 82 that is positioned to support luggage 22 positioned within the overhead stowage bin 12, and the forward lip region 24 extends at least partially vertically above the support surface 82 when the overhead stowage bin 12 is in the open configuration. In some such examples, the forward lip region 24 may be described as having a wall 84 that extends upward from the support surface and that operatively engages luggage 22 when positioned within the internal volume 26 of the overhead stowage bin 12 and/or when luggage 22 slides toward the forward lip region 24, whether as a result of a person pulling on the luggage 22 or as a result of turbulence during a flight. When present, the wall 84 therefore serves to ensure that luggage 22 does not inadvertently slide out of the overhead stowage bin 12 when the overhead stowage bin 12 is in the open configuration.

Also within the scope of the present disclosure are overhead stowage bins that comprise at least a lower panel 18 and one or more reduced friction surfaces on the forward lip region 24 of the lower panel 18, without any rollers 20. In FIGS. 2-5, the schematic representation of rollers 20 also schematically represents reduced friction surfaces of these alternative embodiments. In such alternative embodiments, the reduced friction surface(s) may be integral to the forward lip region 24, such that the forward lip region is constructed of a material having desirable low-friction properties. Additionally or alternatively, the reduced friction surface(s) may be defined by a distinct material that is operatively coupled to the lower panel 18 within the forward lip region 24. For example, the reduced friction surfaces may be defined by a film or other thin material that is adhered or otherwise operatively coupled to the lower panel 18 within the forward lip region 24. Illustrative, non-exclusive examples of suitable materials from which the reduced friction surfaces may be constructed include polyimides (e.g., DELRIN™ and KAPTON™ brands), and fluoropolymers (e.g., TEFLON™ brand). By "reduced friction," it is meant that the reduced friction surface(s) exhibit less surface and/or sliding friction against a luggage unit 22 than a remainder of the lower panel 18 exhibits against a luggage unit 22. With reference to FIGS. 2-5, the reduced friction surface(s) may be described in terms of a width corresponding to the left and right direction in FIGS. 2-5, and a height corresponding to the up and down direction in FIGS. 2-5.

FIG. 7 schematically provides a flowchart that represents illustrative, non-exclusive examples of methods according to the present disclosure. In FIG. 7, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 7 are not limiting and other methods and steps are within the scope of the present disclosure, including methods having greater than or fewer than the number of steps illustrated, as understood from the discussions herein.

As schematically represented in FIG. 7, a method 100 of stowing luggage in an overhead stowage bin comprises lifting 102 a carry-on luggage unit; engaging 104 the carry-on luggage unit with one or more rollers positioned at a forward lip region of the overhead stowage bin; and pushing 106 the carry-on luggage unit into an internal volume of the overhead stowage bin, such that the pushing 106 results in the one or more rollers rotating.

Some methods 100 further comprise pulling 108 the carry-on luggage unit out of the internal volume of the overhead stowage bin. In some such methods 100, the pulling 108 results in the carry-on luggage unit engaging the one or more rollers. In some such methods 100, the pulling 108 does not cause the one or more rollers to rotate.

In some methods 100, the overhead stowage bin is an overhead stowage bin 12 according to the present disclosure.

Illustrative, non-exclusive examples of inventive subject matter according to the present disclosure are described in the following enumerated paragraphs:

A. An overhead stowage bin for aircraft, comprising:

a lower panel configured to support one or more luggage units positioned within the overhead stowage bin, wherein the lower panel has a forward lip region that partially defines an entrance to the overhead stowage bin; and one or more rollers operatively coupled to the lower panel within the forward lip region, wherein the one or more rollers are positioned to facilitate insertion of the one or more luggage units into the overhead stowage bin;

wherein the overhead stowage bin defines an internal volume for receiving the one or more luggage units atop the lower panel, wherein the overhead stowage bin has a closed configuration, in which access to the internal volume is restricted, and an open configuration, in which access to the internal volume is permitted via the entrance for insertion and removal of the one or more luggage units into and from the internal volume.

A1. The overhead stowage bin of paragraph A, further comprising:

an access door pivotally coupled relative to the lower panel, wherein the access door and the lower panel at least partially define the internal volume of the overhead stowage bin, wherein the access door is configured to be selectively pivoted between a closed position in the closed configuration of the overhead stowage bin and an open position in the open configuration of the overhead stowage bin.

A2. The overhead stowage bin of paragraph A, further comprising:

a frame configured to be operatively installed within an aircraft interior; and a bucket pivotally coupled to the frame, wherein the bucket at least partially defines the internal volume of the overhead stowage bin, wherein the bucket is configured to be selectively pivoted between a closed position in the closed configuration of the overhead stowage bin and an open position in the open configuration of the overhead stowage bin, and wherein the bucket comprises the lower panel and the one or more rollers.

A3. The overhead stowage bin of any of paragraphs A-A2, wherein the one or more rollers consists of a single roller that substantially spans an entirety of the forward lip region.

A4. The overhead stowage bin of any of paragraphs A-A2, wherein the one or more rollers consists of a single roller that spans 75-100% of an entirety of the forward lip region.

A5. The overhead stowage bin of any of paragraphs A-A2, wherein the one or more rollers comprises a plurality of rollers spaced-apart within the forward lip region.

A5.1. The overhead stowage bin of paragraph A5, wherein the plurality of rollers consists of a number of rollers equal to a predetermined quantity of typical carry-on luggage units to be positioned within the overhead stowage bin.

A5.2. The overhead stowage bin of any of paragraphs A5-A5.1, wherein each roller of the plurality of rollers has a width that is in the range of 50-100% of a width of typical carry-on luggage units.

A5.3. The overhead stowage bin of any of paragraphs A5-A5.2, wherein each roller of the plurality of rollers has a width in the range of 10-16 inches.

A5.4 The overhead stowage bin of paragraph A5, wherein the plurality of rollers consists of a number of rollers equal to two, three, or four times a predetermined quantity of typical carry-on luggage units to be positioned within the overhead stowage bin.

A5.5 The overhead stowage bin of any of paragraphs A5 and A5.4, wherein each roller of the plurality of rollers has a width in the range of 2-6 inches.

A5.6 The overhead stowage bin of any of paragraphs A5-A5.5, wherein the predetermined quantity of typical carry-on luggage units to be positioned within the overhead stowage bin is two, three, four, five, or six.

A5.7. The overhead stowage bin of any of paragraphs A5-A5.6, wherein typical carry-on luggage units have widths in the range of 10-20 inches, 10-18 inches, 10-16 inches, 10-14 inches, 14-20 inches, 14-18 inches, or 14-16 inches.

A5.8. The overhead stowage bin of any of paragraphs A5-A5.7, wherein each roller of the plurality of rollers comprises, optionally consists of, a spherical roller.

A6. The overhead stowage bin of any of paragraphs A-A5.7, wherein each roller of the one or more rollers comprises, optionally consists of, a cylindrical roller.

A7. The overhead stowage bin of any of paragraphs A-A6, wherein the one or more rollers are configured to rotate only in a single rotational direction.

A7.1. The overhead stowage bin of paragraph A7, wherein the single rotational direction corresponds to an exposed portion of the one or more rollers traveling toward the internal volume of the overhead stowage bin.

A8. The overhead stowage bin of any of paragraphs A-A6, further comprising:

a rotational limiting mechanism operatively coupled to the one or more rollers, wherein the rotational limiting mechanism is configured to permit rotation of the one or more rollers in a first rotational direction and restrict rotation of the one or more rollers in a second rotational direction opposite the first rotational direction.

A8.1. The overhead stowage bin of paragraph A8, wherein the first rotational direction corresponds to an exposed portion of the one or more rollers traveling toward the internal volume of the overhead stowage bin.

A8.2. The overhead stowage bin of any of paragraphs A8-A8.1, wherein the rotational limiting mechanism is further configured to permit rotation of the one or more rollers in the second rotational direction.

A8.2.1. The overhead stowage bin of paragraph A8.2, wherein the rotational limiting mechanism is further configured to impart a rotational friction to the one or more rollers that is greater in the second rotational direction than in the first rotational direction.

A8.3. The overhead stowage bin of any of paragraphs A8-A8.1, wherein the rotational limiting mechanism is further configured to prevent rotation of the one or more rollers in the second rotational direction.

A8.4. The overhead stowage bin of any of paragraphs A8-A8.3, wherein the rotational limiting mechanism comprises a ratcheting mechanism.

A9. The overhead stowage bin of any of paragraphs A-A8.4, wherein each roller of the one or more rollers has a diameter in the range of 0.25-1 inch or 0.5-2 inches.

A10. The overhead stowage bin of any of paragraphs A-A9, wherein when the overhead stowage bin is in the open configuration, the forward lip region has a distal most edge that extends beyond the one or more rollers relative to the internal volume of the overhead stowage bin.

A10.1. The overhead stowage bin of paragraph A10, wherein when the overhead stowage bin is in the open configuration, the distal most edge extends beyond the one or more rollers relative to the internal volume by a distance in the range of 10-100% of a diameter of the one or more rollers.

A11. The overhead stowage bin of any of paragraphs A-A10.1, wherein less than 50%, less than 40%, or less than 30% of an external surface of the one or more rollers is exposed for engagement by the one or more luggage units being inserted into or removed from the internal volume of the overhead stowage bin.

A12. The overhead stowage bin of any of paragraphs A-A11, wherein an exposed portion of each of the one or more rollers is exposed for engagement by the one or more luggage units being inserted into or removed from the internal volume of the overhead stowage bin, and wherein a plane intersecting the one or more rollers and dividing the exposed portion and a hidden portion is at an angle in the range of 15-50 degrees relative to horizontal when the overhead stowage bin is in the open configuration.

A13. The overhead stowage bin of any of paragraphs A-A12, wherein the forward lip region comprises a lip surface that extends directly adjacent to the one or more rollers.

A13.1. The overhead stowage bin of paragraph A13, wherein the lip surface has a proximal portion that extends on a first side of the one or more rollers proximate the internal volume of the overhead stowage bin and a distal portion that extends on a second side of the one or more rollers distal the internal volume of the overhead stowage bin opposite the first side.

A13.2. The overhead stowage bin of any of paragraphs A13-A13.1, wherein the lip surface has at least a proximal portion that extends on a side of the one or more rollers proximate the internal volume of the overhead stowage bin, and wherein the proximal portion has a depth that is 10-50% of a diameter of the one or more rollers.

A13.3. The overhead stowage bin of any of paragraphs A13-A13.2, wherein the lip surface has at least a distal portion that extends on a side of the one or more rollers distal the internal volume of the overhead stowage bin, and wherein the distal portion has a depth that is 10-50% of a diameter of the one or more rollers.

A13.4. The overhead stowage bin of any of paragraphs A13-A13.3, wherein the lip surface has at least a proximal portion that extends on a side of the one or more rollers proximate the internal volume of the overhead stowage bin, and wherein the proximal portion is generally planar and extends at an angle in the range of 15-50 degrees relative to horizontal when the overhead stowage bin is in the open configuration.

A13.5. The overhead stowage bin of any of paragraphs A13-A13.4, wherein the lip surface has at least a distal portion that extends on a side of the one or more rollers distal the internal volume of the overhead stowage bin, and wherein the distal portion is generally planar and extends at an angle in the range of 15-50 degrees relative to horizontal when the overhead stowage bin is in the open configuration.

A13.6. The overhead stowage bin of any of paragraphs A13-A13.5, wherein the lip surface has at least a proximal portion that extends on a side of the one or more rollers proximate the internal volume of the overhead stowage bin, and wherein the proximal portion extends above the one or more rollers by a distance in the range of 10-100% of a diameter of the one or more rollers when the overhead stowage bin is in the open configuration.

A13.7. The overhead stowage bin of any of paragraphs A13-A13.5, wherein a top surface of the one or more rollers extends vertically above an entirety of the lip surface when the overhead stowage bin is in the open configuration.

A14. The overhead stowage bin of any of paragraphs A-A13.5, wherein a top surface of the one or more rollers extends vertically above an entirety of the forward lip region when the overhead stowage bin is in the open configuration.

A15. The overhead stowage bin of any of paragraphs A-A14, wherein the lower panel comprises a support surface positioned to support the one or more luggage units positioned within the overhead stowage bin, and wherein the forward lip region extends at least partially vertically above the support surface when the overhead stowage bin is in the open configuration.

A16. An aircraft, comprising:
a fuselage, wherein the fuselage includes a passenger compartment; and
a plurality of the overhead stowage bin of any of paragraphs A-A15 installed within the passenger compartment.

A17. The use of the overhead stowage bin of any of paragraphs A-A15 to stow the one or more luggage units in an aircraft.

A18. The use of the overhead stowage bin of any of paragraphs A-A15 to facilitate insertion of the one or more luggage units into the overhead stowage bin.

A19. The use of the overhead stowage bin of any of paragraphs A-A15 to restrict removal of the one or more luggage units from the overhead stowage bin.

B. A method of stowing luggage in an overhead stowage bin, the method comprising:
lifting a carry-on luggage unit;
engaging the carry-on luggage unit with one or more rollers positioned at a forward lip region of the overhead stowage bin; and
pushing the carry-on luggage unit into an internal volume of the overhead stowage bin, wherein the pushing results in the one or more rollers rotating.

B1. The method of paragraph B, further comprising:
pulling the carry-on luggage unit out of the internal volume of the overhead stowage bin.

B1.1. The method of paragraph B1, wherein the pulling results in the carry-on luggage unit engaging the one or more rollers.

B1.1.1. The method of paragraph B1.1, wherein the pulling does not cause the one or more rollers to rotate.

B2. The method of any of paragraphs B-B1.1.1, wherein the overhead stowage bin is the overhead stowage bin of any of paragraphs A-A15.

C. An overhead stowage bin for aircraft, comprising:
a lower panel configured to support one or more luggage units positioned within the overhead stowage bin, wherein the lower panel has a forward lip region that partially defines an entrance to the overhead stowage bin; and
one or more reduced friction surfaces on the forward lip region of the lower panel, wherein the one or more reduced friction surfaces are positioned to facilitate insertion of the one or more luggage units into the overhead stowage bin, wherein the one or more reduced friction surfaces exhibit less surface and/or sliding friction against the one or more luggage units than a remainder of the lower panel exhibits against the one or more luggage units;
wherein the overhead stowage bin defines an internal volume for receiving the one or more luggage units atop the lower panel, wherein the overhead stowage bin has a closed configuration, in which access to the internal volume is restricted, and an open configuration, in which access to the internal volume is permitted via the entrance for insertion and removal of the one or more luggage units into and from the internal volume.

C1. The overhead stowage bin of paragraph C, further comprising:
an access door pivotally coupled relative to the lower panel, wherein the access door and the lower panel at least partially define the internal volume of the overhead stowage bin, wherein the access door is configured to be selectively pivoted between a closed position in the closed configuration of the overhead stowage bin and an open position in the open configuration of the overhead stowage bin.

C2. The overhead stowage bin of paragraph C, further comprising:
a frame configured to be operatively installed within an aircraft interior; and
a bucket pivotally coupled to the frame, wherein the bucket at least partially defines the internal volume of the overhead stowage bin, wherein the bucket is configured to be selectively pivoted between a closed position in the closed configuration of the overhead stowage bin and an open position in the open configuration of the overhead stowage bin, and wherein the bucket comprises the lower panel and the one or more reduced friction surfaces.

C3. The overhead stowage bin of any of paragraphs C-C2, wherein the one or more reduced friction surfaces consists of a single reduced friction surface that substantially spans an entirety of the forward lip region.

C4. The overhead stowage bin of any of paragraphs C-C2, wherein the one or more reduced friction surfaces consists of a single reduced friction surface that spans 75-100% of an entirety of the forward lip region.

C5. The overhead stowage bin of any of paragraphs C-C2, wherein the one or more reduced friction surfaces comprises a plurality of reduced friction surfaces spaced-apart within the forward lip region.

C5.1. The overhead stowage bin of paragraph C5, wherein the plurality of reduced friction surfaces consists of a number of reduced friction surfaces equal to a predetermined quantity of typical carry-on luggage units to be positioned within the overhead stowage bin.

C5.2. The overhead stowage bin of any of paragraphs C5-C5.1, wherein each reduced friction surface of the plurality of reduced friction surfaces has a width that is in the range of 50-100% of a width of typical carry-on luggage units.

C5.3. The overhead stowage bin of any of paragraphs C5-C5.2, wherein each reduced friction surface of the plurality of reduced friction surfaces has a width in the range of 10-16 inches.

C5.4 The overhead stowage bin of paragraph C5, wherein the plurality of reduced friction surfaces consists of a number of reduced friction surfaces equal to two, three, or four times a predetermined quantity of typical carry-on luggage units to be positioned within the overhead stowage bin.

C5.5 The overhead stowage bin of any of paragraphs C5 and C5.4, wherein each reduced friction surface of the plurality of reduced friction surfaces has a width in the range of 2-6 inches.

C5.6 The overhead stowage bin of any of paragraphs C5-C5.5, wherein the predetermined quantity of typical carry-on luggage units to be positioned within the overhead stowage bin is two, three, four, five, or six.

C5.7. The overhead stowage bin of any of paragraphs C5-C5.6, wherein typical carry-on luggage units have widths in the range of 10-20 inches, 10-18 inches, 10-16 inches, 10-14 inches, 14-20 inches, 14-18 inches, or 14-16 inches.

C6. The overhead stowage bin of any of paragraphs C-C5.7, wherein each reduced friction surface of the one or more reduced friction surfaces has a height in the range of 0.25-1 inch or 0.5-2 inches.

C7. The overhead stowage bin of any of paragraphs C-C6, wherein the lower panel comprises a support surface positioned to support the one or more luggage units positioned within the overhead stowage bin, and wherein the forward lip region extends at least partially vertically above the support surface when the overhead stowage bin is in the open configuration.

C8. An aircraft, comprising:
a fuselage, wherein the fuselage includes a passenger compartment; and
a plurality of the overhead stowage bin of any of paragraphs C-C7 installed within the passenger compartment.

C9. The use of the overhead stowage bin of any of paragraphs C-C7 to stow the one or more luggage units in an aircraft.

C10. The use of the overhead stowage bin of any of paragraphs C-C7 to facilitate insertion of the one or more luggage units into the overhead stowage bin.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An overhead stowage bin for aircraft, comprising:
a lower panel configured to support one or more luggage units positioned within the overhead stowage bin, wherein the lower panel has a forward lip region that partially defines an entrance to the overhead stowage bin; and
one or more rollers operatively coupled to the lower panel within the forward lip region, wherein the one or more rollers are positioned to facilitate insertion of the one or more luggage units into the overhead stowage bin;
wherein the overhead stowage bin defines an internal volume for receiving the one or more luggage units atop the lower panel, wherein the overhead stowage bin has a closed configuration, in which access to the internal volume is restricted, and a fully open configuration, in which access to the internal volume is permitted via the entrance for insertion and removal of the one or more luggage units into and from the internal volume; and
wherein the forward lip region comprises a lip surface that extends directly adjacent to the one or more rollers, wherein the lip surface defines an opening through which the one or more rollers extend, and wherein less than 50% of the one or more rollers extend through the opening and out of the forward lip region for engagement by the one or more luggage units being inserted into or removed from the internal volume of the overhead stowage bin.

2. The overhead stowage bin of claim 1, further comprising:
an access door pivotally coupled relative to the lower panel, wherein the access door and the lower panel at least partially define the internal volume of the overhead stowage bin, wherein the access door is configured to be selectively pivoted between a closed position in the closed configuration of the overhead stowage bin and a fully open position in the fully open configuration of the overhead stowage bin.

3. The overhead stowage bin of claim 1, further comprising:
a frame configured to be operatively installed within an aircraft interior; and
a bucket pivotally coupled to the frame, wherein the bucket at least partially defines the internal volume of the overhead stowage bin, wherein the bucket is configured to be selectively pivoted between a closed position in the closed configuration of the overhead stowage bin and a fully open position in the fully open configuration of the overhead stowage bin, and wherein the bucket comprises the lower panel and the one or more rollers.

4. The overhead stowage bin of claim 1, wherein the one or more rollers consists of a single roller that substantially spans an entirety of the forward lip region.

5. The overhead stowage bin of claim 1, wherein the one or more rollers consists of a single roller that spans 75-100% of an entirety of the forward lip region.

6. The overhead stowage bin of claim 1, wherein the one or more rollers comprises a plurality of rollers spaced-apart within the forward lip region.

7. The overhead stowage bin of claim 6, wherein the plurality of rollers consists of a number of rollers equal to a predetermined quantity of typical carry-on luggage units to be positioned within the overhead stowage bin, and wherein each roller of the plurality of rollers has a width in the range of 10-16 inches.

8. The overhead stowage bin of claim 6, wherein the plurality of rollers consists of a number of rollers equal to two, three, or four times a predetermined quantity of typical carry-on luggage units to be positioned within the overhead stowage bin, and wherein the plurality of rollers each have a width in the range of 2-6 inches.

9. The overhead stowage bin of claim 8, wherein the typical carry-on luggage units have widths in the range of 10-20 inches.

10. The overhead stowage bin of claim 1, wherein the one or more rollers are configured to rotate only in a single rotational direction, and wherein the single rotational direction corresponds to an exposed portion of the one or more rollers traveling toward the internal volume of the overhead stowage bin.

11. The overhead stowage bin of claim 1, further comprising:
a rotational limiting mechanism operatively coupled to the one or more rollers, wherein the rotational limiting mechanism is configured to permit rotation of the one or more rollers in a first rotational direction and restrict rotation of the one or more rollers in a second rotational direction opposite the first rotational direction, wherein the first rotational direction corresponds to an exposed portion of the one or more rollers traveling toward the internal volume of the overhead stowage bin.

12. The overhead stowage bin of claim 11, wherein the rotational limiting mechanism is further configured to permit rotation of the one or more rollers in the second rotational direction, and wherein the rotational limiting mechanism is further configured to impart a rotational friction to the one or more rollers that is greater in the second rotation direction than in the first rotational direction.

13. The overhead stowage bin of claim 1, wherein when the overhead stowage bin is in the fully open configuration, the forward lip region has a distal most edge that extends beyond the one or more rollers relative to the internal volume of the overhead stowage bin, and wherein when the overhead stowage bin is in the fully open configuration, the distal most edge extends beyond the one or more rollers relative to the internal volume by a distance in the range of 10-100% of a diameter of the one or more rollers.

14. The overhead stowage bin of claim 1, wherein an exposed portion of each of the one or more rollers is exposed for engagement by the one or more luggage units being inserted into or removed from the internal volume of the overhead stowage bin, and wherein a plane intersecting the one or more rollers and dividing the exposed portion and a hidden portion is at an angle in the range of 15-50 degrees relative to horizontal when the overhead stowage bin is in the fully open configuration.

15. The overhead stowage bin of claim 1, wherein the lip surface has at least a distal portion that extends on a side of the one or more rollers distal the internal volume of the overhead stowage bin, and wherein the distal portion has a depth that is 10-50% of a diameter of the one or more rollers.

16. The overhead stowage bin of claim 1, wherein the lip surface has at least a distal portion that extends on a side of the one or more rollers distal the internal volume of the overhead stowage bin, and wherein the distal portion is generally planar and extends at an angle in the range of 15-50 degrees relative to horizontal when the overhead stowage bin is in the fully, open configuration.

17. The overhead stowage bin of claim 1, wherein when the overhead stowage bin is in the fully open configuration, a portion of the one or more rollers extends vertically above an entirety of the forward lip region.

18. The overhead stowage bin of claim 1, wherein the lower panel comprises a support surface positioned to support the one or more luggage units positioned within the overhead stowage bin, and wherein the forward lip region extends at least partially vertically above the support surface when the overhead stowage bin is in the fully open configuration.

19. An aircraft, comprising:
a fuselage, wherein the fuselage includes a passenger compartment; and
a plurality of the overhead stowage bin of claim 1 installed within the passenger compartment.

20. An overhead stowage bin for aircraft, comprising:
a lower panel configured to support one or more luggage units positioned within the overhead stowage bin, wherein the lower panel has a forward lip region that partially defines an entrance to the overhead stowage bin, wherein the overhead stowage bin defines an internal volume for receiving the one or more luggage units atop the lower panel, wherein the overhead stowage bin has a closed configuration, in which access to the internal volume is restricted, and a fully, open configuration, in which access to the internal volume is permitted via the entrance for insertion and removal of the one or more luggage units into and from the internal volume; and
one or more rollers are positioned to facilitate insertion of the one or more luggage units into the overhead stowage bin;
wherein the forward lip region comprises a lip surface that extends directly adjacent to the one or more rollers, wherein the lip surface comprises a distal portion that extends on a side of the one or more rollers distal the internal volume of the overhead stowage bin, and wherein the distal portion is generally planar and extends at an angle in the range of 15-50 degrees relative to horizontal when the overhead stowage bin is in the fully open configuration.

21. An overhead stowage bin for aircraft, comprising:
a lower panel configured to support one or more luggage units positioned within the overhead stowage bin, wherein the lower panel has a forward lip region that partially defines an entrance to the overhead stowage bin; and
one or more rollers operatively coupled to the lower panel within the forward lip region, wherein the one or more rollers are positioned to facilitate insertion of the one or more luggage units into the overhead stowage bin;
wherein the overhead stowage bin defines an internal volume for receiving the one or more luggage units atop the lower panel, wherein the overhead stowage bin has a closed configuration, in which access to the internal volume is restricted, and a fully open configuration, in which access to the internal volume is permitted via the entrance for insertion and removal of the one or more luggage units into and from the internal volume; and
wherein the forward lip region comprises a lip surface that extends directly adjacent to the one or more rollers, wherein the lip surface comprises a proximal portion that extends on a side of the one or more rollers proximate the internal volume of the overhead stowage bin, and wherein when the overhead stowage bin is in the fully open configuration, the proximal portion extends vertically above the one or more rollers by a distance in the range of 10-100% of a diameter of the one or more rollers.

22. The overhead stowage bin of claim 21, wherein the proximal portion is generally planar and extends at an angle in the range of 15-50 degrees relative to horizontal when the overhead stowage bin is in the fully open configuration.

* * * * *

UNITED STATES PATENT AND TRADEMARK OFFICE
CERTIFICATE OF CORRECTION

Page 1 of 1

PATENT NO. : 10,351,243 B2
APPLICATION NO. : 15/178920
DATED : July 16, 2019
INVENTOR(S) : Richard K. Simms It is certified that error appears in the above-identified patent and that said Letters Patent is hereby corrected as shown below:

In the Claims

Claim 20, Column 16, Lines 19-20, replace "fully, open" with --fully open--

Claim 20, Column 16, Line 24, insert --one or more rollers operatively coupled to the lower panel within the forward lip region, wherein the-- before "one or more rollers are positioned"

Signed and Sealed this
Third Day of December, 2019

Andrei Iancu
*Director of the United States Patent and Trademark Office*